2 Sheets--Sheet 1.
J. HILDRETH, Jr.
Improvement in Soldering-Machines.
No. 132,286. Patented Oct. 15, 1872.
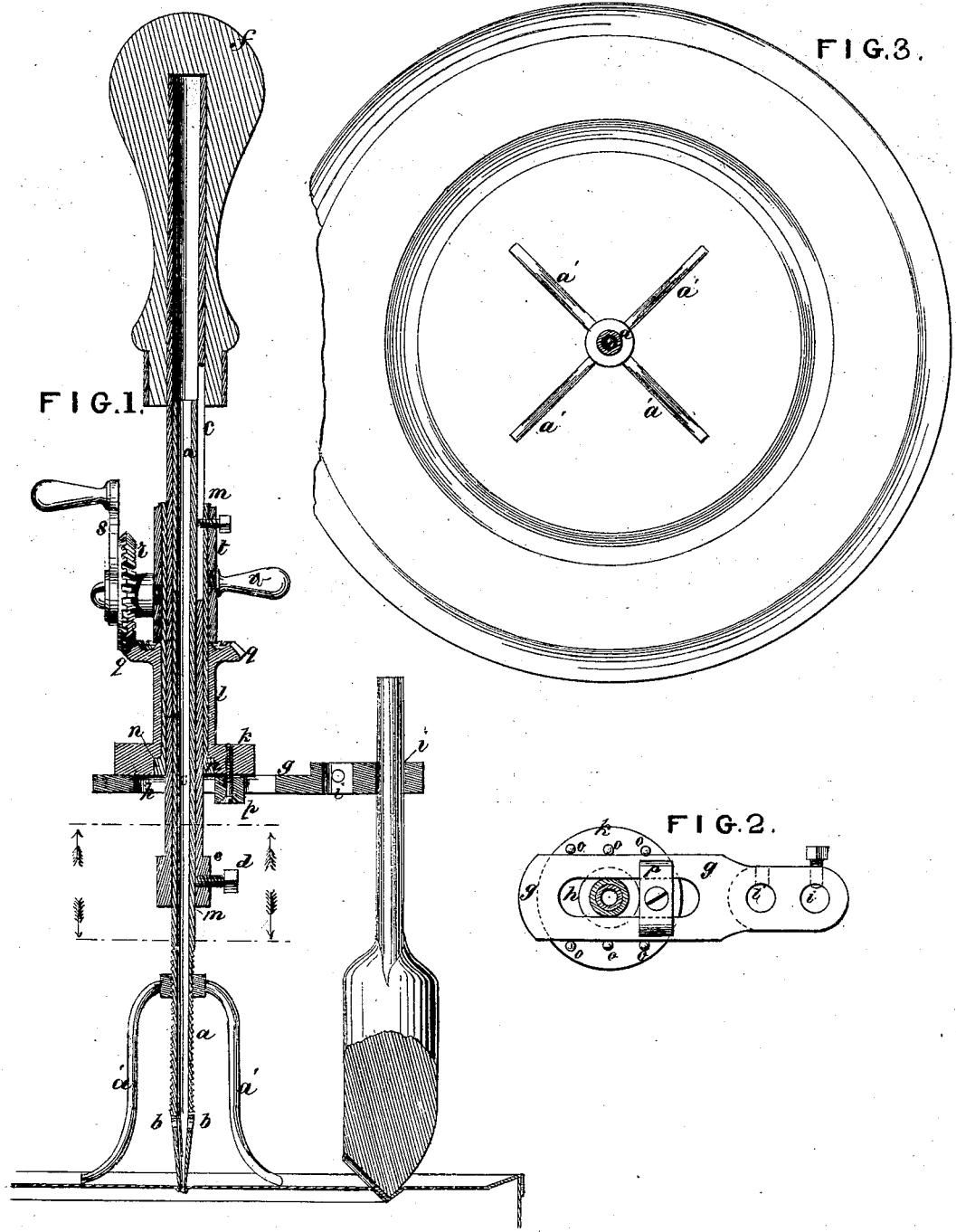
Witnesses.
W. Ready
Walter Allen
Inventor.
Joshua Hildreth Jr.
By Knight Bro.
Atty.

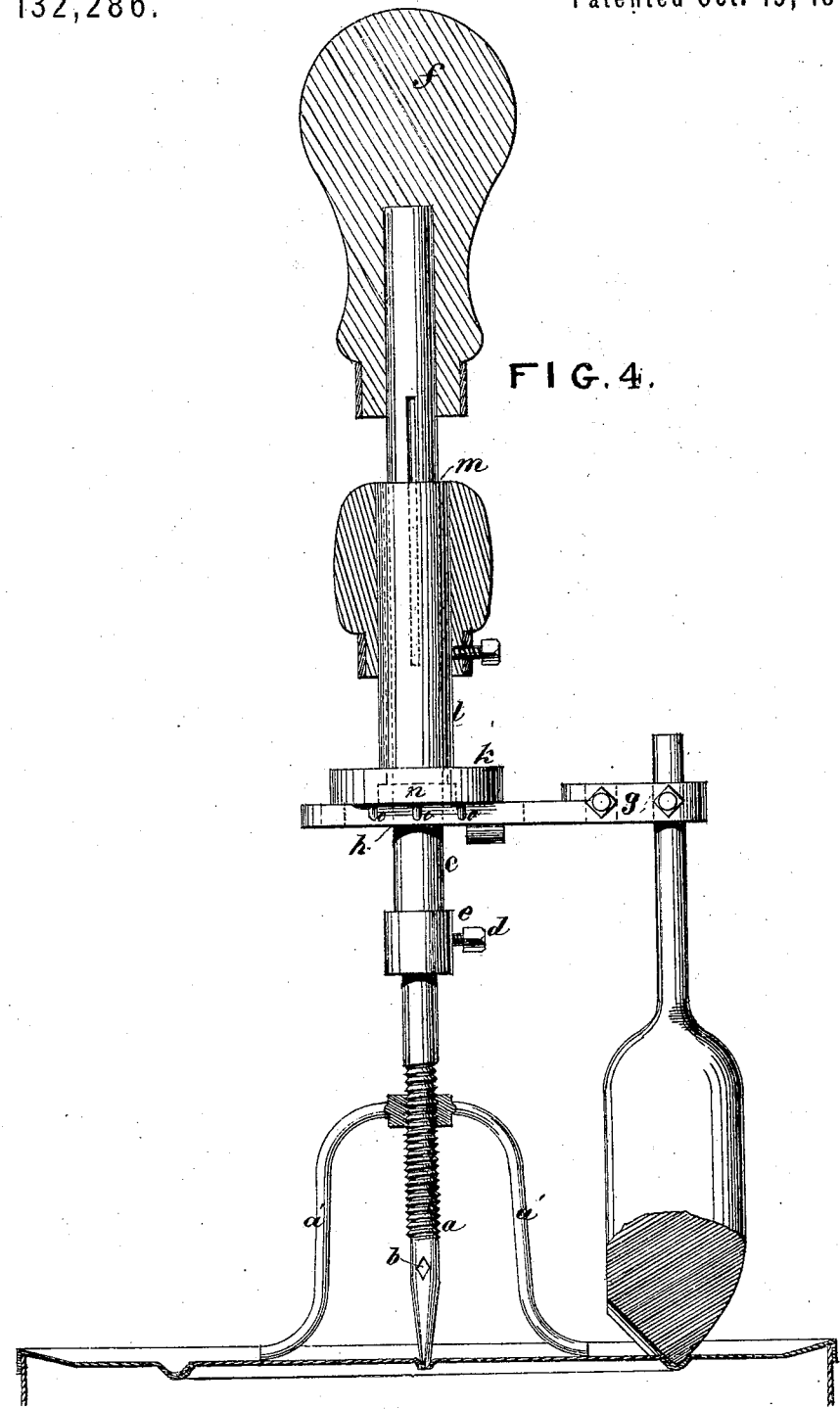

UNITED STATES PATENT OFFICE.

JOHNA HILDRETH, JR., OF PHILADELPHIA, PENNSYLVANIA.

IMPROVEMENT IN SOLDERING-MACHINES.

Specification forming part of Letters Patent No. 132,286, dated October 15, 1872.

*To all whom it may concern:*

Be it known that I, JOHNA HILDRETH, Jr., of Philadelphia, in the county of Philadelphia and State of Pennsylvania, have invented certain Improvements in Soldering-Machines, of which the following is a specification:

Nature and Objects of the Invention.

My invention relates to improvements in the devices for operating soldering-irons, and though it may be employed elsewhere is intended more particularly to be applied to soldering fruit and other cans; and consists, first, in the employment of a tube sharpened at its end to perforate the top of the can and support the soldering-iron and its accessories, said tube being hollow and perforated or slotted to allow the escape of air from the can in the soldering process, and screw-threaded near its lower end and for the reception of a crow-foot to bear upon the cap and prevent its springing. My invention further consists in the employment of a hollow cylinder, in which the tube which supports the soldering-iron accurately fits, and in which the supporting-tube may be vertically adjusted by a set-screw for soldering irons of varying lengths. My invention further consists of a plate or arm provided with a slot embracing the supporting-tube, said arm having perforations for the reception of the soldering-iron, and sliding vertically on a tube, enabling thereby a vertical and horizontal or radial adjustment, and a rotary motion of the soldering-iron around the supporting-tube as an axis.

Description of the Drawing.

Figure 1 is a vertical longitudinal section of a soldering-machine embodying my invention. Fig. 2 is a bottom view of the slotted arm and cap which holds the soldering-iron. Fig. 3 is a plan view of the top plate of a can with the supporting-tube and crow-foot attached thereto. Fig. 4 is a sectional view of a soldering-machine embodying my invention as operated by the handle.

General Description.

$a$ is the supporting-tube of the soldering apparatus, the lower end of which rests at the center of the top face of the can to be soldered. The supporting-tube $a$ is made hollow, and is sharpened at its lower end to perforate the can at the center of its top, it being found necessary that an air-hole should be made in the can in the soldering process. $b\ b$ are perforations in the hollow tube $a$ for the escape of air from the can. A screw-thread may also be cut on the supporting-tube $a$, to which a crow-foot $a'$ may be screwed or otherwise attached for soldering in large-sized cans to prevent springing. $c$ is a hollow cylinder of greater diameter than the tube $a$, the latter fitting accurately in the former, and capable of being slid up or down in it and held in any desired position by the set-screw $d$ passing through the collar $e$ on the lower end of the hollow cylinder $c$. By this construction it will be seen that the supporting-tube may readily be adjusted vertically. The upper end of the hollow cylinder $c$ terminates in a handle, $f$, by means of which the operator can hold the supporting-tube and its accessories in proper position, and make the perforation before described in the top of the can. $g$ is an arm provided with a slot, $h$, through which the tube passes, and having perforations $i\ i$ in its outer end for the reception of the handle of the soldering-iron, which can, by its insertion into one or other of the holes $i\ i$, be adjusted horizontally at different distances from the supporting-tube $a$, and also be adjusted vertically. $k$ is a collar on the tube $l$ surrounding the hollow cylinder $c$ and tube $m$, the latter being provided with an annulus, $n$, turning in the collar $k$. $o\ o$ are projections or pins on the lower face of the collar $k$ and on each side of the slotted arm $g$. $p$ is a T-shaped block having a lug fitting in the slot of the arm $g$, through which a set-screw passes, thus securely attaching the collar $k$ to the slotted arm, and permitting a horizontal adjustment of the soldering-iron by moving radially the arm $g$, and then fastening the T-block $p$. On the upper end of the tube $l$ is the horizontal bevel-gear wheel $q$, which engages with the bevel-gear $r$ operated by the crank $s$, the axis of which is secured to the square box $t$, which is fastened to the tube $m$ by a set-screw, which passes through said tube and operates in a vertical groove, $u$, in the upper end of the hollow cylinder $c$. $v$ is a handle attached to the box $t$, by means of which it may be raised or lowered. By this construction a rotary motion can be given the soldering-iron, and it can also be adjusted both vertically and horizontally. A modification of this part of the invention, as shown in Fig. 4, may be employed, in which the bevel-gear wheels and crank are dispensed with, and the tube $l$ is turned by the handle $f$, preferably for certain kind of work, when it is not desired to revolve the soldering-iron so rapidly as by the bevel-wheels.

Claims.

I claim as new and of my invention—

1. The combination of the perforated and hollow supporting-tube $a$, adjustable tube $c$, crow-foot $a'$, slotted and perforated arm $g$, attaching-collar $k$, and T-shaped block $p$, all constructed and arranged to operate as set forth.

2. The slotted arm $g$, constructed as set forth, in combination with the collar $k$, T-shaped block $p$, tube $l$, and bevel-wheels $q\,r$, for giving rotary motion to the soldering-iron, as described.

3. The box $t$, provided with a set-screw and tube $m$, in combination with the tube $c$ provided with a groove, in which said set-screw operates, as and for the purpose set forth.

4. The collar $k$, provided with pins $o\,o$, slotted arm $g$, T-shaped block $p$, and handle $f$, (see Fig. 4,) by means of which the soldering-iron may be rotated and vertically adjusted by the handle, in the manner and for the purpose set forth.

JOHNA HILDRETH, JR.

Witnesses:
OCTAVIUS KNIGHT,
WALTER ALLEN.